US008439301B1

(12) United States Patent (10) Patent No.: US 8,439,301 B1
Lussier et al. (45) Date of Patent: May 14, 2013

(54) SYSTEMS AND METHODS FOR DEPLOYMENT AND OPERATION OF UNMANNED AERIAL VEHICLES

(75) Inventors: David A. Lussier, Exeter, RI (US); Andrew J. Delisle, Tiverton, RI (US); Philip M. Torrence, West Warwick, RI (US)

(73) Assignee: Systems Engineering Associates Corporation, Middletown, RI (US)

( * ) Notice: Subject to any disclaimer, the term of this patent is extended or adjusted under 35 U.S.C. 154(b) by 0 days.

(21) Appl. No.: 13/552,591

(22) Filed: Jul. 18, 2012

Related U.S. Application Data

(60) Provisional application No. 61/508,926, filed on Jul. 18, 2011.

(51) Int. Cl.
*B64F 1/04* (2006.01)
(52) U.S. Cl.
USPC ............................ 244/63; 89/1.813; 89/1.814
(58) Field of Classification Search .................... 244/3.1, 244/63; 89/36.17, 902, 1.813, 1.814, 1.11; 102/207
See application file for complete search history.

(56) References Cited

U.S. PATENT DOCUMENTS

| 988,611 | A | 4/1911 | Wilson |
|---|---|---|---|
| 3,119,302 | A | 1/1964 | Barr |
| 3,228,385 | A | 1/1966 | Damm |
| 3,404,598 | A | 10/1968 | Angelos |
| 3,830,214 | A | 8/1974 | Curtis |
| 3,968,947 | A | 7/1976 | Schlegel |
| 3,989,206 | A | 11/1976 | Gregory |
| 4,151,798 | A | 5/1979 | Ridgeway |
| 4,549,464 | A | 10/1985 | Hawkins |
| 4,909,458 | A | 3/1990 | Martin |
| 4,944,210 | A | 7/1990 | Flock |
| 5,024,160 | A | 6/1991 | Canterberry |
| 5,076,607 | A | 12/1991 | Woods |
| 5,305,974 | A | 4/1994 | Willis |
| 5,361,524 | A | 11/1994 | Karkau |
| 5,589,141 | A | 12/1996 | Sides |
| 5,695,153 | A | 12/1997 | Britton |
| 5,792,976 | A | 8/1998 | Genovese |
| 5,997,666 | A | 12/1999 | Wheatley |
| 6,007,022 | A | 12/1999 | Stallard |
| 6,260,802 | B1 | 7/2001 | Hampsten |
| 6,418,870 | B1 | 7/2002 | Lanowy |
| 6,457,673 | B1 | 10/2002 | Miller |
| 6,568,631 | B1 | 5/2003 | Hillsdon |
| 6,918,340 | B2 | 7/2005 | Daoud |
| 7,089,843 | B2 | 8/2006 | Miller |
| 7,090,166 | B2 | 8/2006 | Dennis |

(Continued)

*Primary Examiner* — Philip J Bonzell
(74) *Attorney, Agent, or Firm* — The Fletcher Law Firm PLLC; Brian N. Fletcher

(57) ABSTRACT

An unmanned aerial vehicle (UAV) system provides for UAV deployment and remote, unattended operation with reduced logistics requirements. The system includes a launcher that can include one or more launch tubes, each launch tube configured to house a UAV in a canister and one or more gas generators operatively connected to each canister and configured to push the UAV out of the launch tube by releasing gas into the canister. A controller for activating the gas generators can sequentially, and with a predetermined time delay, expel the UAV with a desired velocity and acceleration. The system further includes a UAV recovery device, a power supply, a security subsystem, a command and control subsystem and a communications subsystem. Command, control and communications can be provided between a remote station and the UAV.

19 Claims, 5 Drawing Sheets

U.S. PATENT DOCUMENTS

| | | |
|---|---|---|
| 7,114,680 B2 | 10/2006 | Dennis |
| 7,128,294 B2 | 10/2006 | Roeseler |
| 7,210,654 B1 | 5/2007 | Cox |
| 7,216,642 B2 | 5/2007 | Poesch |
| 7,278,658 B2 | 10/2007 | Boucher |
| 7,410,124 B2 | 8/2008 | Miller |
| 7,472,866 B2 | 1/2009 | Heaston |
| 7,484,450 B2 | 2/2009 | Hunn |
| 7,540,227 B2 | 6/2009 | McCants |
| 7,556,219 B2 | 7/2009 | Page |
| 7,584,925 B2 | 9/2009 | Miller |
| 7,665,691 B2 | 2/2010 | Hanzlick |
| 7,686,247 B1 | 3/2010 | Monson |
| 7,712,702 B2 | 5/2010 | McGeer |
| 7,729,812 B2 * | 6/2010 | Spaner ............... 700/295 |
| 7,735,440 B2 | 6/2010 | Corboy |
| 7,739,938 B2 | 6/2010 | Nair |
| 7,849,778 B1 | 12/2010 | McCants |
| 2002/0195181 A1 | 12/2002 | Lundstrom |
| 2007/0018033 A1 | 1/2007 | Fanucci |
| 2009/0107386 A1 | 4/2009 | Sampson |
| 2009/0242693 A1 | 10/2009 | Urnes |
| 2009/0314883 A1 | 12/2009 | Arlton |
| 2010/0025543 A1 | 2/2010 | Kinsey |
| 2010/0252676 A1 | 10/2010 | Koessler |
| 2011/0168838 A1 * | 7/2011 | Hornback et al. ............ 244/63 |
| 2011/0315817 A1 * | 12/2011 | Miralles et al. ............ 244/63 |

* cited by examiner

SYSTEMS AND METHODS FOR DEPLOYMENT AND OPERATION OF UNMANNED AERIAL VEHICLES

CROSS-REFERENCE TO RELATED APPLICATIONS

This application claims priority from U.S. Provisional Patent Application Ser. No. 61/508,926, filed Jul. 18, 2011, the disclosure of which is hereby incorporated by reference in its entirety.

STATEMENT REGARDING FEDERALLY SPONSORED RESEARCH OR DEVELOPMENT

Not Applicable.

BACKGROUND

1. Field

The disclosed subject matter is generally directed to unmanned aerial vehicle (UAV) systems, and more particularly, to systems and methods that provide for the deployment and remote operation of UAVs in, for example, reconnaissance operations.

2. Description of Related Art

Known UAVs can be defined as powered aerial vehicles that do not carry a human operator, use aerodynamic forces to provide vehicle lift, can fly autonomously or be piloted remotely, can be expendable or recoverable, and can carry a lethal or nonlethal payload.

There can be a wide variety of UAV shapes, sizes, configurations, and characteristics. For example, using known communications systems, UAVs can be controlled from a remote location, or fly autonomously based on pre-programmed flight plans using more complex dynamic automation systems, or a combination of both. Historically, UAVs were simple drones (remotely piloted aircraft), but autonomous control is increasingly being employed in UAVs. Known UAVs are also able to transmit data, such as video, to remote locations.

Known UAVs can perform military reconnaissance as well as strike missions. UAVs can also be used for civil applications, such as nonmilitary security work, e.g., surveillance of pipelines.

Known miniature and micro UAV systems can use fixed-wing UAVs or rotary-wing UAVs that can require extensive human interaction to prepare a UAV for launch, get the UAV airborne and fly the UAV, either locally or remotely, out to radio frequency (RF) line-of-sight ranges. The UAVs generally return to the same location for landing from which they were launched so that the human operators can recover the UAVs and repair and/or prepare them for another flight.

Typical launch methods for fixed-wing UAVs can include human-powered launch by hand, or on a rail system typically powered by pneumatic, pyrotechnic, elastomeric ("bungee cord"), or electromagnetic subsystems. Both basic methods of launch require operator interaction to prepare the launcher as well as the UAV, with pre-flight checks, for example.

Additionally, known UAV deployment and operation systems, such as disclosed in U.S. Pat. No. 7,089,843 to Miller et al., can require extensive logistics. For example, air compressors, compressed air storage tanks and electrical power generators and the fuel to run them may have to be transported long distances to support the remote deployment and operation of UAVs. In some locations, the personnel and logistics requirements may make desired UAV operations impractical.

SUMMARY

The disclosed subject matter provides a UAV deployment and operation system capable of reliable remote, unattended operation. In an embodiment, a standalone tower, or trailer containing a tower, can support UAV storage, launch and recovery equipment. UAVs employed by the systems described herein may be of a compressed carriage design, i.e., the UAV's control surfaces can fold inward around the fuselage so that the UAV can fit into a launch tube.

A UAV configured for a reconnaissance mission, for example, can be launched using a rotating launcher module that uses inputs of wind direction and speed to facilitate launches and recoveries into the wind. Once airborne, data from the UAV, including, for example, streaming video and telemetry data from the objects in view of the UAV camera, can be monitored remotely using a variety of known communications links. Remote UAV command and control can also be accomplished over a variety of communications links.

In an embodiment, UAV launch can be accomplished using an inflator-based impulse mechanism. Using such a system, launch reliability can be enhanced over known systems by the replacement of current launcher systems with, for example, commercially available gas generators, such as automotive air bag gas generators or cold gas inflators, that can provide the impulse energy to launch a UAV from a tube. Commercially available inflators, typically with a long shelf life, can be relatively inexpensive, reliable and permit the modularity of a sealed and relatively maintenance-free launcher system. Through inflator selection and variable timing, for example, this technology can be adapted to a variety of UAV platforms.

An inflator-based impulse mechanism can reduce the logistics requirements of the remote standalone UAV system, e.g., no need for air compressors or large compressed air storage tanks or external power. The inflator technology can provide a payload launcher that is very modular, requires little or no maintenance and can be nearly 100% operationally ready at all times. Because of the versatility of the inflators, various UAV types, with different characteristics, can be accommodated within a single launcher. Because the system is mostly self-contained, it can be used aboard most any platform such as ground vehicles or sea going vessels and can be installed, removed or modified quickly for mission-specific payloads.

In an embodiment, the system can include an integrated UAV arresting gear or net to facilitate recovery of the UAVs.

In an embodiment, the system can use solar or wind power to generate electricity to eliminate the need for an external power supply.

In an embodiment, access to the launcher area can be secured to prevent tampering of the unattended system, e.g., the launchers and UAVs. Components of the system can be constructed of steel or other suitable material to prevent damage from small arms fire, for example. Additionally, the system can include local security monitoring features as part of a security subsystem. For example, the tower area can have motion sensors and a camera system suitable for daytime and nighttime monitoring of the area around the UAV system. In an embodiment, when a motion sensor is triggered by a possible intruder, the camera system can be automatically activated and can be controlled from a remote station such that live streaming video of the area around the UAV system can be viewed from a remote location.

In an embodiment, an unmanned aerial vehicle (UAV) system can include a launcher, comprising one or more launch tubes, each launch tube configured to house a UAV in a canister, each canister comprising an energetics module configured to release a gas to push the UAV out of the launch tube by releasing gas into the canister; and a power generation and storage system comprising at least one of a photovoltaic cell and a wind turbine for supplying power to the UAV system.

An exemplary method of operating an unmanned aerial vehicle (UAV) system can include loading a canister containing the UAV into a launcher and activating a plurality of gas generators sequentially and with a predetermined time delay to expel the UAV with a desired velocity and acceleration.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals or characters are used throughout the several views and embodiments to designate like components.

DETAILED DESCRIPTION

To facilitate an understanding of the principles upon which the subject matter disclosed herein is based, most illustrative embodiments are described hereinafter with reference to their implementation at a remote, land-based site. It will be appreciated that the practical applications of these principles are not limited to this particular type of implementation. Rather, they can be equally employed in any other type of UAV system operating environment where it is desired to provide for periods of deployment and operation with reduced personnel and logistics requirements.

Figure 1:
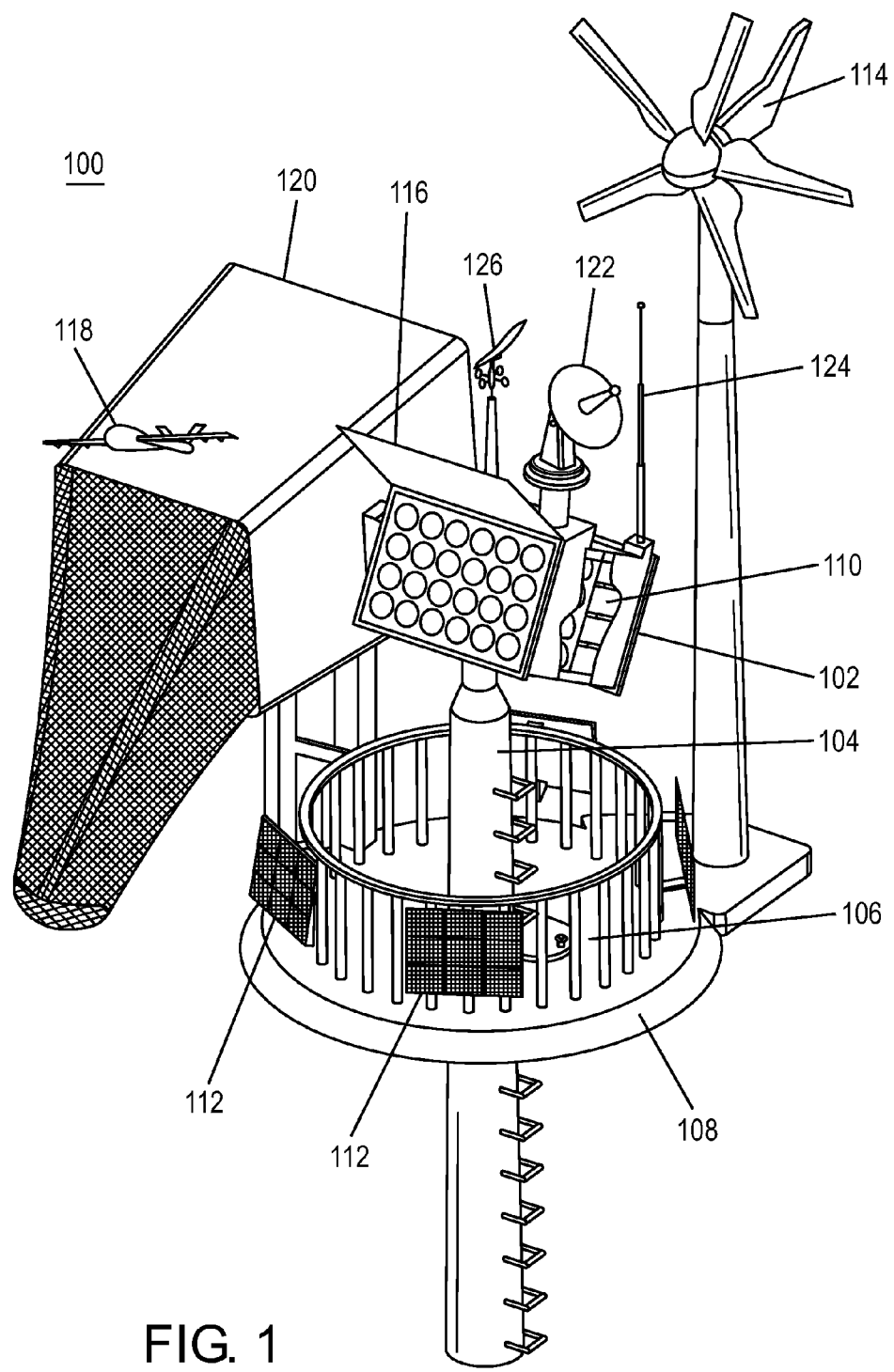
FIG. 1 shows a perspective view of an embodiment of a UAV system.

FIG. 1 shows an illustrative embodiment of UAV system 100. In an embodiment, UAV system 100 can include a launcher 102, hereinafter referred to as a Launch Tube Cluster (LTC), comprising one or more launch tubes (LTs) 110 configured to house UAVs in a UAV canister (UC) (not shown in FIG. 1). In an embodiment, a 24-tube LTC 102 can be mounted on a fixed support structure, such as tower 104. Tower 104 containing UAV system 100 can be erected in an area to provide a security monitoring capability on a relatively long-term or even permanent basis, for example. Tower 104 can include security features, for example, a lockable hatch 106 to provide secure access to platform 108. In an embodiment, UAV system 100 can include accommodation for 24 UCs that can reside in the 24 LT modules 110 that make up LTC 102. As shown in FIG. 1, there can be 24 launch tubes arranged in four rows of six launch tubes. The launch tubes can be made from known composite materials, for example.

Tower 104 can be designed to resist tampering, for example, by shielding components with known armor materials, such as those used in bulletproof vests. Other suitable armor materials can be used to protect equipment from, for example, small-caliber handgun and shotgun projectiles and small fragments from explosives such as hand grenades. As mentioned, a secure, lockable platform 108 near the top of tower 104 can be provided for access to perform maintenance, for example. The platform 108 can be accessible via a ladder at the base of the tower through a secure, lockable hatch 106, for example.

Additionally, the system can include local security monitoring features as part of a security subsystem. For example, motion sensors or other suitable detection devices placed on or near the UAV system can be monitored by the UAV system. In an embodiment, in response to a motion sensor being triggered by a possible intruder, a camera system suitable for daytime and nighttime monitoring of the area around the UAV system can be automatically activated and can transmit live streaming video of the area around the UAV system. This video can be viewed from a remote location, for example. In an embodiment, a remote control station can also control functions, e.g., pan, tilt and zoom, of the UAV system's local security cameras.

In an embodiment, UAV system 100 can include a self-contained power generation and management system that can include an energy storage device, e.g., a battery bank (not shown), that can be kept charged by inputs from, for example, photovoltaic cells 112 and wind turbine 114 so that UAV system 100 can be self-sufficient and not require connection with an external power source. In an embodiment, connections can be provided to allow for power to be supplied from external sources.

In an embodiment, LTC 102 can include an outer door 116 that can provide weather and small arms protection in the closed position. Outer door 116 can be configured to open before a LT 110 launches a UAV 118.

In an embodiment, UAV system 100 can include a UAV recovery device. For example, UAV Homing Channel (HC) 120 can facilitate the recovery of UAVs at the end of a flight. UAVs 118 can be vectored by known methods, e.g., GPS, to a latitude, longitude and altitude that can correspond to the center of HC 120 such that when the UAV enters HC 120, it can be arrested and fall into the netting material portion of HC 120.

In an illustrative embodiment, HC 120 can be an approximately 6'×6' (1.8 m×1.8 m) square, vertically-oriented opening that tapers down to approximately 4'×4' (1.2 m×1.2 m) after a depth of approximately 6' (1.8 m), thus creating a tapered channel for UAVs 118 to fly into and be directed towards the center. The back end of HC 120 can have netting material with small holes and can extend for 3' (0.9 m) beyond the top edge of the HC 120 so the UAVs 118 can be arrested within the netting and fall down into a bag-shaped container that may be self-draining. Other suitable ways to facilitate the recovery of UAVs may also be used.

In an embodiment, UAV system 100 can include a command and control computer processor system that can perform a variety of controller functions, including power management, communications, launcher control, and system control, to name a few non-limiting examples. The command and control system can include known computer processors and other data processing and communications devices that are suitable for performing the abovementioned functions.

In an embodiment, system power management can be performed by harnessing energy from the abovementioned environmental sources and automatically regulating power levels within a UAV system 100 energy storage system, e.g., a battery bank of suitable size, to perform UAV system 100 functions.

In an embodiment, launcher control functionality can be carried out by the command and control computer system using, for example, self-tests of individual LTs 110 with UAVs loaded to determine whether the UAVs and launchers are in a ready state before launch.

In an embodiment, a launch command signal can be provided by the command and control computer system to a LT/UC. The command and control system can provide precise ignition of individual inflators in any given LT/UC, thus enabling impulse launch of the UAV 118 out of the LT/UC. Once a UAV 118 is launched, the control system can maintain an inventory of LTs in the UAV system and can provide an indication to an operator regarding tube load status and other desired system parameters.

In an embodiment, the command and control computer system can be wired from a computer, located on tower 104, for example, to individual LTs 110 within the LTC 102. These wire signal paths can provide individual address capability from the command and control computer system to individual LT/UC units, enabling both communication with the UAV in the UC as well as control of inflator ignition and associated timing.

In an embodiment, LTC 102 and HC 120 orientation can be controlled by the command and control computer system such that LTC 102 can be rotated, typically into the wind when the wind speed is greater than approximately 10 knots (5.1 m/s) to help facilitate successful UAV transition to flight as well as recovery of UAVs into the HC 120 into the wind. In an embodiment, a wind vane and anemometer unit 126 can be used to provide wind speed and directional information to the command and control computer system. In an embodiment, the command and control computer system can send signals to an electric motor, for example, to rotate LTC 102 for desired orientation. Likewise, a similar configuration can be used to control the orientation of HC 120.

In an embodiment, a local connection to the UAV system can be provided for a laptop computer or any other suitable type of device, to be used by maintenance and operations personnel to check the health and status of the UAV system on site as well as control UAV launches locally. Such a local connection can be made using known wired or wireless methods.

In an embodiment, UAV system processors can also convert video received from UAV 118. For example, raw video in NTSC format can be converted to MPEG4 format for subsequent efficient bandwidth streaming to the Internet via a local cellular connection of the UAV system.

In an embodiment, a communications subsystem can be used to perform communications functions such as system communications with the UAV 118 in flight as well as concurrent communications with a local commercial cellular network, for example, using known communications devices and methods. Communications with the UAV 118 can be performed while in the LT/UC via an umbilical cable, for example.

In an embodiment, once the UAVs 118 are in flight, the UAV system 100 can communicate with the UAVs 118 using a communications subsystem over multiple frequencies via a directional antenna 122 on the system tower 104, for example. In an embodiment, one frequency may be used for UAV command and control (i.e., used to instruct the UAV where to go), and another frequency may be used for the system to receive data from the UAV 118, for example, streaming video from camera(s) onboard the UAV 118. Communications with a local commercial cellular network, for example, may be accomplished using any suitable antenna 124.

Figure 2:
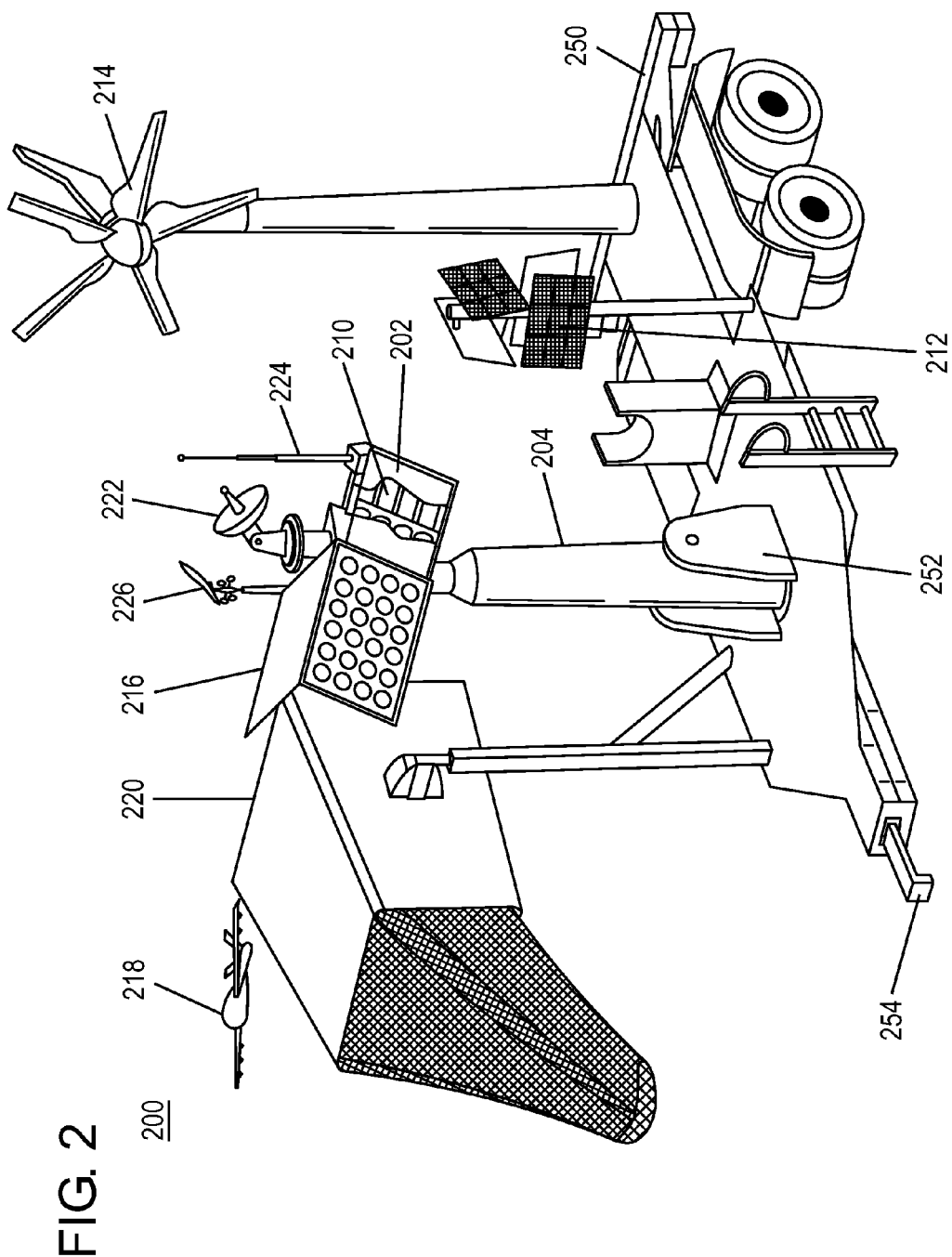
FIG. 2 shows a perspective view of an embodiment of a trailer-based portable UAV system.

FIG. 2 shows an illustrative embodiment of UAV system 200. UAV system 200 can contain the same or similar components as shown in FIG. 1 with UAV system 100, but can be arranged on a mobile support structure in a mobile or portable configuration such that system 200 can be transported on a trailer 250, for example, thus enabling a capability to be positioned at a location that is currently in need of security but not necessarily on a long-term or permanent basis.

In such a portable configuration, trailer 250 and the UAV system components can be designed to fit into a standard ISO shipping container of approximately 8'×8'×40' (2.4 m×2.4 m×12.2 m), for example, so that the system can be shipped and deployed as required. Once this mobile variant is unloaded near its deployment site, the trailer 250 with UAV system components, which in one embodiment can weigh less than approximately 6000 lbs (2721.6 kg), could be towed to an operational location by a suitable vehicle capable of moving such a load. In an embodiment, the trailer can be less than approximately 3000 lbs (1360.8 kg) and the UAV system 200 equipment on the trailer 250 can be less than approximately 3000 lbs (1360.8 kg), resulting in a total system weight of approximately 6000 lbs (2721.6 kg).

In an embodiment, UAV system 200 can include a hinge-type arrangement 252 to facilitate raising and lowering the LTC 202 and the communications antennae 222 and 224 on tower 204, as well as the HO 220. Other suitable methods and structures may also be used to raise and lower system 200 components. A non-limiting example of a suitable trailer 250 is a dual-axle trailer with a standard 2" (5 cm) receiver hitch 254 for towing by known vehicles with suitable towing capacity. As with system 100 shown in FIG. 1, the local components of system 200 may not all be located on tower 204.

Figure 3:
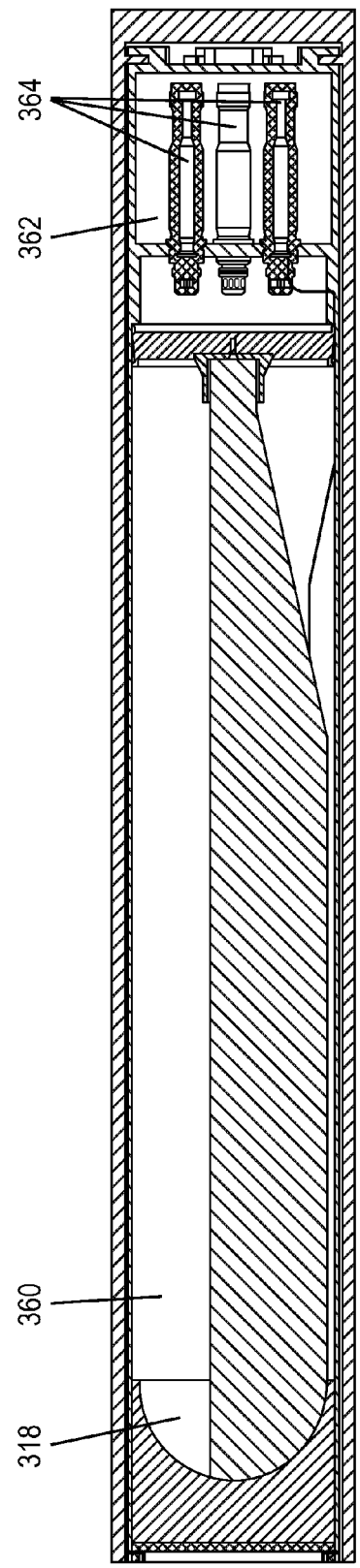
FIG. 3 shows a cross-sectional view of an embodiment of a launch tube and canister showing the position of a UAV prior to launching.

FIG. 3 shows an illustrative embodiment of a UAV prior to launch. For both the fixed/permanent tower-based and portable variants of the UAV system, the following descriptions can apply, but reference will be made to the embodiment shown in FIG. 1 where necessary. UAV 318 can be housed in a UAV Canister (UC) 360, which can serve as what is known in the art as an All-Up-Round (AUR) payload capable of being loaded into UAV system 100 LT 110. UC 360 can contain UAV 318 as well as an energetics module 362, which may be configured to impulse launch UAV 318 out of the UC 360.

UC 360 can be configured to mate operationally, e.g., mechanically and electrically, with the LT 110 in a loading process. In an embodiment, an electrical connection between LT 110 and other UAV system 100 components can be designed such that operators and maintenance personnel can communicate with UAV 318 in the tubes as well as control the ignition and associated timing of the individual air bag inflators.

In an embodiment, UC 360 can have a known bayonet-type connector or keyed ram plate at the breech end, with one part of the bayonet connector sized differently than the others. Such an arrangement can help establish a situation such that when UC 360 is loaded into LT 110, there is a desired UAV orientation, e.g., topside upwards, to facilitate UAV flight. Other suitable methods, such as visual indications on UC 360 can be used to assist operators in achieving a desired in-tube UAV orientation.

In an embodiment, once a UAV has been launched and recovered, items requiring replacement, e.g., batteries, in the UAV can be replaced and the UAV can be reloaded into an empty UC, and replacement inflators can be loaded into the UC, making the UC a replenished unit ready for reload and launch from a LT once again.

In an embodiment, energetics module 362 can comprise one or more gas generators or inflators 364, which can be operatively connected to each canister and configured to push UAV 318 out of UC 360 and the LT by releasing gas into the canister. In an embodiment, a launch controller or processor that can be part of the UAV system command and control system can be used such that multiple gas generators 364 can be activated sequentially with a predetermined time delay. Such an embodiment—employing predetermined time delays—can produce a pressure wave of predetermined and predictable characteristics that can expel UAV 318 with a desired velocity and acceleration. By adjusting the number and sequence of the inflators, for example, electrically, the impulse pressure used to launch a UAV can be precisely controlled such that the UAV has the appropriate energy to successfully leave the LT/UC and have enough ballistic force to successfully transition to unmanned and self-sustained flight. A torpedo launch mechanism and method, also using an inflator-based impulse system, is described in co-owned U.S. Pat. No. 6,418,870, the disclosure of which is hereby incorporated by reference in its entirety.

In an embodiment, sabot material made of foam, for example, can be inserted in the UC to secure the forward end of the UAV within the UC so as to minimize the UAV becoming dislodged or damaged during routine shipping and loading into the LT. The sabot material can be in two pieces, for example, so that it flies apart during launch and does not inhibit the successful UAV transition to flight. The sabot material can push against a Muzzle Cap (MC), which can force the cap out of the UC during the impulse launch process. The MC can be retained on the UC during transport and stowage by any suitable means, such as through the use of small retaining pins that can be bent or broken during the impulse process.

For each UAV launch, the consumable items can include pins on the MC and inflators. The UC, sabot material, UAV, and other UAV system components can be expected to survive UAV launches and be reusable for subsequent replenishment and reuse. UAV batteries may need to be recharged.

Figure 4:
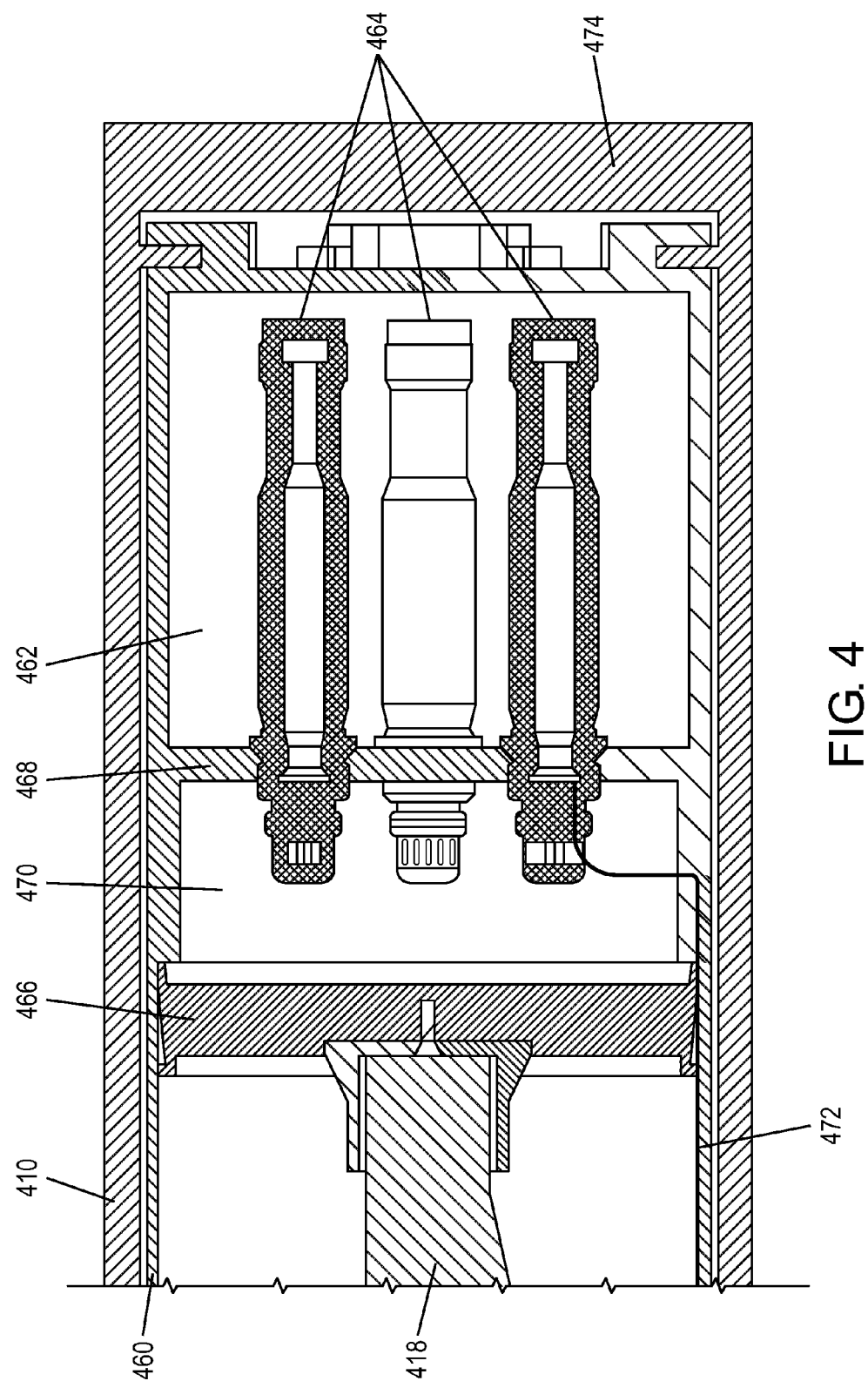
FIG. 4 shows a cross-sectional view of an embodiment of a launch tube and canister showing the arrangement of the UAV, ram plate and inflators.

FIG. 4 shows an illustrative embodiment of a close-up view of energetics module 462 of the LT/UC shown in FIG. 3. In an embodiment, UC 460 can include a device, such as ram plate (RP) 466 behind the UAV 418 in UC 460 that can serve several purposes. First, RP 466 can secure the aft end of UAV 418 in UC 460 in an appropriate location and orientation within UC 460. Second, RP 466 can serve as a mechanical interface between the inflator gasses and UAV 418 such that RP 466 serves as a device that can push UAV 418 out of UC 460 during the impulse launch. Third, RP 466 can provide a mechanical moving seal with UC 460 inside wall surface so that the inflator gases can be efficiently used to push RP 466 and UAV 418 out of UC 460 along the length of LT 410. RP 466 can then be ejected out of UC 460 during launch. In an embodiment, RP 466 can have a higher aerodynamic drag and lower inertia than UAV 418, wherein as the UAV 418 and the RP 466 exit the LT/UC, the higher aerodynamic drag and lower inertia of the RP 466 can cause a rapid deceleration and separation of the RP 466 from the UAV 418, thereby allowing UAV 418 to continue a ballistic flight path prior to transition to self-propelled flight.

In an embodiment, UC 460 can have a cavity for energetics module 462 toward the breech end that can accommodate up to four airbag inflators 464, for example, that can be threaded into an array plate 468 to hold inflators 464 in a sturdy manner to allow inflators 464 to be discharged into plenum volume 470. The inflators 464 can be sealed with an O-ring or similar sealing device. In an embodiment, plenum volume 470 can be defined as a space between the inflator 464 orifices and the RP 466. This volume can be designed to be of an appropriate size to accept the discharge from the first inflator ignition and begin moving the RP 466 and UAV 418 out of the UC/LT without imposing too much acceleration force on the UAV.

Once RP 466 has begun motion, and at an appropriate and predetermined time in the ballistics sequence, for example, when the pressure has peaked and is beginning to decrease, the next inflator in the sequence can be initiated. This sequence may continue until all the inflators are discharged. This innovative process can minimize the acceleration forces on the UAV, thus minimizing unwanted damage to the UAV in the launch process.

While FIG. 4 shows a cutaway view of a design capable of holding four inflators, any appropriate number could be provided, for example, between 1 and 6, depending on the size and weight of the UAV and the UAV's requirements to transition to flight with respect to required minimum LT exit velocity and maximum acceleration force the UAV can withstand.

In an embodiment, the UC can be sealed with respect to the path for the inflator gasses and can have a single electrical connector that facilitates connectivity to the LTC with a signal interface to the command and control subsystem.

As used herein, the term "inflator" can be defined as including any replaceable, self-contained, sealed device that provides non-toxic, non-flammable, non-corrosive gases under pressure in a controlled manner, either as a by-product of a chemical reaction or through release of a stored inert compressed gas, or both, in response to an electrical signal. Exemplary inflators can include standard, commercial, off-the-shelf automotive air bag inflators, including those of the cold gas variety. Suitable inflators can also include hybrid gas inflators wherein a combination of compressed cold gas and some amount of energetic gas propellant can be employed. Propellant gas generators may also be used.

In an embodiment, an inflator can be a small, high pressure, high reliability flask that contains a quantity of one or more inert gases, such as argon and/or helium, under pressure. In an embodiment, on ignition, a small initiator can break a seal, releasing cold gas, or a small initiator can ignite solid propellant that can burn and generate a gas that mixes with the inert gases in the vessel to heat it. A seal of the pressure vessel containing the inert gases can be burned, burst, or ruptured using a piston or a shock wave. The gas from the propellant can be mixed with the inert gases and can escape through a thrust-neutralized port.

Several known vendors, including Autoliv, Key Safety Systems and Atlantic Research Corporation (ARC), produce known examples of suitable inflators that can be used to launch UAVs.

Examples of known inflators are described in the following patents, the contents of which are expressly incorporated herein by reference: U.S. Pat. Nos. 7,883,108; 6,170,868; 5,979,936; 3,723,205; 3,756,621; 3,895,821; 5,033,772; 5,076,607; 5,345,876; 5,777,699; 5,899,411; 5,601,310; 5,747,730; 5,763,821; 5,850,053; 5,861,571; and 5,997,666. Such automotive cold gas generators can be desirable because they can be built to standards that are set by the automotive industry and that can exceed military standards for reliability. Such inflators can meet military-like specifications for longevity, impact resistance and insensitivity as munitions. The combustion product gas mix is typically benign. The firing readiness of such inflators typically does not degrade over time. Shelf life of these inflators can be at approximately twenty years with no maintenance or inspection required.

As discussed, in various embodiments, any number of inflators can be used to achieve UAV launch. Although four inflators are shown for purposes of illustration in FIG. 3 and FIG. 4, a smaller or larger number could be used, depending on the performance desired. Moreover, inflators can be fired sequentially, simultaneously, or in any combination thereof as necessary to produce the desired exit velocity and acceleration forces for UAV launch. The number of inflators and the time delay between inflator firings can be selected to create a required minimum exit velocity a UAV can require to successfully transition to self-sustained flight while minimizing the acceleration forces imparted on the UAV during the launch impulse.

In an illustrative embodiment, for launching UAVs from a remote tower, for example, where the UAV can be less than approximately 6" (15.24 cm) in diameter in the compressed carriage (loaded in tube) configuration, a minimum velocity upon exit of a UAV from the end of the LT can be about 25 mph (40 kph) and the maximum acceleration can be limited so as to not exceed approximately 100 g's, depending on the particular UAV being launched. Known UAVs that can be candidates for use in UAV systems 100 and 200 can include Aeroenvironment SWITCHBLADE, Prioria MAVERIC, CLMax PIRANHA, Brock SHARK, Lite Machines VOYEUR, L3 CUTLASS, and BAE COYOTE. Other suitable UAVs can also be used.

In an embodiment, to achieve desired ballistic results, three or four inflators can be used, and the time delay between firing of the inflators can be about 15 milliseconds, although time delays of anywhere between approximately 6 and 35 milliseconds can be used. In an embodiment, with a greater number of gas generators used, a greater UAV acceleration and exit velocity can be achieved. In an embodiment, decreasing the time delay between firings can also increase UAV acceleration and exit velocity.

In an embodiment, the launcher tubes can be operationally ready once the inflators have been loaded, and the time required to make a particular tube firing-ready after launch can be substantially reduced with the use of the AUR UC. As a result, a higher state of readiness can be maintained than is possible with known systems.

In an embodiment, a cable 472, e.g., an umbilical-type connector can be connected to the UAV 418 in the UC 460 such that the UAV 418 can communicate via the UC 460 and command and control system with a local or remote control station. The umbilical can be made of small ribbon cable, for example, that does not interfere with the launch process yet enables the UAV to be preset and monitored before launch, in addition to keeping the UAV battery in an optimally charged state for maximum flight time. In an illustrative embodiment, the umbilical can be made of a small ribbon cable with 14 connectors. The umbilical connector can be pulled out of a UAV-side connector when the UAV begins its launch travel out of the UC. In an embodiment, after being connected to the UAV, umbilical cable 472 can rest in a small cutout area in the bottom of the UC, for example, before coming out at the breech end 474 of UC 460 to mate with the LTC. In an embodiment, the umbilical cable can be thin enough that it will not interfere with the travel of RP 466 down the UC/LT during the launch process.

In an embodiment, an internal UAV motor battery can be kept charged using known wireless induction methods. In an embodiment, information can be exchanged between the command and control system and the UAV in a LT via a wireless infrared linkage.

Figure 5:
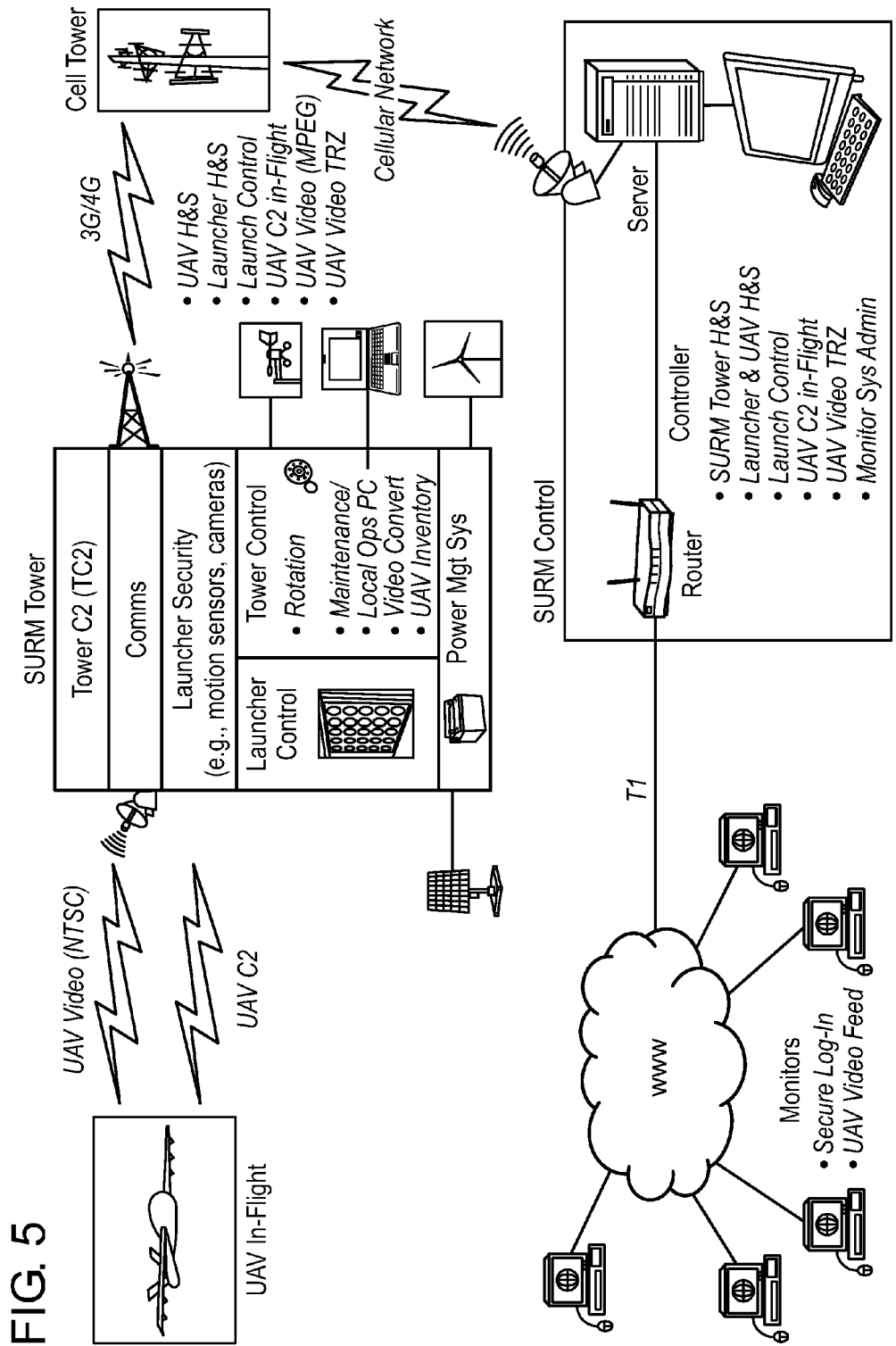
FIG. 5 shows a block diagram of an embodiment of a UAV system.

FIG. 5 shows a block diagram of an illustrative embodiment of a UAV system command, control and communications system architecture that can be implemented using UAV system 100's communications subsystem. In this illustrative embodiment, the UAV system is referred to as "SURM," for Security UAV Reconnaissance Module. In an embodiment, connectivity of the UAV system to the Internet via a cellular network, for example, can enable the UAV system to be accessed by a remote control station. The remote control station can control the UAV system as well as administer the ability of other remote users to access a remote control server, for example, to be able to monitor UAV data, such as video, in a secure manner. In an embodiment, the remote control station can control the launch, flight control, and landing/homing of UAVs, whereas other users may only have the ability to monitor data from the UAV via the Internet.

In an embodiment, connectivity between the UAV system and a remote control station may be achieved by using known 3G or 4G cellular networks and protocols, for example, Code Division Multiple Access (CDMA) or Global System for Mobile (GSM), in order to provide UAV system capability worldwide.

In an embodiment, in areas where cellular service may not be available, or in an environment such as a military application where reliance on commercial cellular networks may not be desirable, other alternative command, control and communications schemes can be employed. In an embodiment, satellite communications can be employed such that the UAV system can communicate directly via a satellite link to a remote control station or via the Internet after satellite linkage.

In an embodiment, an airborne asset, such as an AWACS, can be employed as a primary command, control and communications node with a remote control station inside the airborne asset. In an embodiment, an airborne asset could relay the UAV system command, control and communications signals to a remote operator at another location, such as on a nearby ship or shore facility.

In an embodiment, there can be two operators remotely controlling UAV functions. For example, one operator can control and monitor the UAV command and control functions while a second operator can be dedicated to controlling and monitoring the functions associated with a UAV's payload, for example, a camera or other sensor, or a munitions payload.

In an embodiment, a remote control station can control UAV launch, but after the UAV is airborne and over an area of interest, a local operator on the ground can assume control of the UAV such that the local operator takes control of the UAV and payload, e.g., camera, and landing aspects of the UAV in a more local type of operation.

In an embodiment, the UAV system can be configured to be pre-programmed via a remote control station to launch a UAV at a desired time in the future to, for example, make a patrol video scanning run down a security line of interest. In an embodiment, the UAV can return to the UAV system from which it was launched or proceed to another one. In this example, the video from this type of run can be stored on a server and be available to a remote control station operator or fed to other monitors to be viewed at a later time. In an embodiment, such a capability can allow the programming of patrols by UAVs to record video in areas of interest at specific times of interest while minimizing the need for human interaction with the system.

In an embodiment, a UAV system can be associated with other remote sensors, e.g., motion sensors, and configured to automatically launch a UAV to a nearby area, e.g., within 15 miles, in response to a signal from the other, e.g., motion sensor. This capability can allow for the rapid, automatic surveillance of an area, e.g., within several minutes, as compared with systems requiring control by operators.

In an embodiment, the UAV system can function in three basic modes, e.g., SLEEP, READY, and OPERATIONS. In SLEEP mode, the UAV system can conserve battery power while waiting to receive a "wake-up" command from a remote control station, for example.

In an embodiment, while in the SLEEP mode, the system can still perform some active functions, such as local security monitoring using a security subsystem. For example, motion sensors or other suitable detection devices placed on or near the UAV system can be monitored by the UAV system. In an embodiment, when a motion sensor is triggered by a possible intruder, for example, a camera system suitable for daytime and nighttime monitoring of the area around the UAV system can be automatically activated and can transmit live streaming video of the area around the UAV system that can be viewed from a remote location. In an embodiment, a remote control station can also control functions, e.g., pan, tilt and zoom, of the UAV system's local security cameras.

Upon receipt of a "wake-up" command, the UAV system can perform, for example: self-tests, checks of the inventory and status of loaded UAVs, determination and alignment of the LTC for proper orientation with the wind if it is greater than approximately 10 kts, and reporting to a control station that the UAV system is ready for launch. Such a system readiness signal could allow the UAV system to transition to the READY mode.

In an embodiment, the UAV system can remain in the READY mode for up to one hour, for example, before returning to the SLEEP mode if no launch has been initiated. If a UAV is launched during READY mode, the UAV system can enter OPERATIONS mode. In the OPERATIONS mode, the UAV system can serve as a communication node between remote stations and the UAV in flight. For example, the UAV system can receive streaming video from the UAV and can send command and control instructions to the UAV to fly specific tracks based on control station direction.

In an embodiment, the UAV system can employ security features, such as encrypted communications that can minimize tampering, jamming or interference with the communications frequencies to and from UAVs in flight as well as to the cellular network, for example. The UAV system can be configured with specific USER ID account information only available to the control station, for example, for access, e.g., login to the system, and control of the UAV system.

In an embodiment, the UAV system can have a directional antenna for communicating with UAVs to maximize signal strength and resulting communication ranges between launched UAVs and the UAV system. In an embodiment, antenna rotation and azimuth control power can be provided by a rechargeable battery, for example, a $LiO_2$ battery.

In an embodiment, UAVs can communicate with the UAV system on configurable frequencies, for example 900 MHz, 1.7 GHz, or 2.4 GHz for command and control signals that can be used to control UAV course, speed, altitude, waypoints, battery life, and general health and status, for example. In an embodiment, UAVs can provide streaming video to the UAV system on 2.4 GHz or 4.8 GHz, for example. In an embodiment, in situations where poor signal quality or jamming conditions can exist, alternative methods of transmitting on various frequencies, including automatically switching among frequency channels, can be employed at the UAV, at the UAV system and at a remote station.

In an embodiment, UAVs can be launched from one UAV system and can be recovered at another UAV system up to approximately 20 miles (32.2 km) away, for example. Thus, UAVs do not necessarily have to return to the system from which they were launched. This feature can facilitate, for example, a "patrol" option, wherein a UAV can patrol an area of interest from one point to another. In an embodiment, a 20 mile (32.2 km) distance between UAV systems may be based on the communications range of the systems employed and may not necessarily be the limit of the distance a UAV can fly, which could be as much as 30 miles (48.3 km), for example.

In an embodiment, in the event a portable variant of the UAV system is in motion or a UAV system is moved after a UAV is launched, the UAV system can still provide command and control of a UAV in flight and a UAV can still find its way back to the UAV system, even though the launch point may have moved. For example, a fixed "lever arm," which can be the 3D vector description of the precise distance from a GPS location on the UAV system to the precise center of the HO, can be used by the UAV during its return flight home to find the center of the HO no matter where the tower is located.

In an embodiment, the UAV system can be integrated with land-based vehicles or waterborne vessels. In these examples, power supply and management can be provided by the host platform. Other aspects of the UAV system can still be as described above, however, remote operation may be performed while embarked on the vehicle or vessel. If the host vehicle or vessel is itself operated unmanned, remote operation of the UAV system can be configured as previously described.

In an embodiment, UAV battery life can be monitored, for example, continuously, both in the LT and while in flight. An alert can be provided to a remote operator when UAV battery life is at a point of having just enough power to return to the nearest UAV system for recovery, for example. In an embodiment, a remote control station can be provided with the ability to acknowledge a low battery alert. In an embodiment, instead of directing the UAV to fly "home," e.g., to the nearest UAV system, the UAV could instead be kept on station, providing additional surveillance video, for example, with the realization that the UAV will land elsewhere and not at a UAV system. In an illustrative scenario, a ground-based individual could retrieve a UAV from where it lands away from a UAV system, replace the battery in the UAV and hand-launch the UAV locally to provide a rapid turnaround of surveillance capability.

Exemplary UAV payloads can include still and video cameras suitable for daytime or nighttime operations. In an embodiment, video transmitted by the UAV can be analog NTSC at 480 lines. In an embodiment, a UAV can be equipped with a suitable IR camera with 320×240 resolution with white or black hot display, for example. In an embodiment, a UAV can be equipped with a high-resolution electro-optical camera at 5 megapixel resolution, for example. The quality of the video and photos from UAV cameras can be enhanced by known video enhancement firmware onboard the UAV or by software at a control station, for example. UAV payloads can also be selected to provide other capabilities, such as through the use of suitable biological, radiological and chemical sensors, to name a few non-limiting examples.

In an embodiment, a UAV can be equipped with a munitions payload, for example, to permit the UAV to perform strike operations in addition to monitoring and surveillance. For example, a UAV with a munitions payload can be directed to fly to an area of interest and conduct video surveillance of a detected target. In an embodiment, a control station operator can direct the UAV to the target and fly an impact route into the target. The UAV's munitions payload can be detonated by impact or proximity sensors or by remote command, for example, in an effort to eliminate or disable the target.

These aforementioned aspects of various embodiments of the UAV system can allow UAVs to be pre-positioned by either a relatively permanent or portable UAV system variant at locations where occasional or frequent surveillance may be desired. By reducing the need for personnel to deploy to these areas to launch, operate, and recover UAVs, the cost of security operations can be reduced by allowing many aspects of UAV system operation to be conducted remotely. In addition, the time required to deploy a UAV to a remote site can be greatly reduced if the UAV system can be pre-positioned in relatively close proximity to the area of interest, for example, less than approximately 5 miles (8 km).

Additionally, through the use of automotive air bag inflators, logistics requirements can be reduced because commercially available inflators have been available for some time for automotive use, can have a shelf life of approximately 20 years, and have been demonstrated to be essentially leak-proof. Thus, the UAV system disclosed herein can have reduced maintenance requirements when compared with known UAV launchers.

In various embodiments, the UAV system can be used in applications such as border security, law enforcement, military Forward Operating Base (FOB) security, or general security for high-value facilities such as power plants, oil refineries, prisons, government facilities/bases, or coastal security/defense, to name a few non-limiting examples.

The above description is presented to enable a person skilled in the art to make and use the systems and methods described herein, and is provided in the context of a particular application and its requirements. Various modifications to the embodiments will be readily apparent to those skilled in the art, and generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. An unmanned aerial vehicle (UAV) system, comprising:
   a launcher, comprising:
   one or more launch tubes, each launch tube configured to house a UAV in a canister, each canister comprising an energetics module configured to release a gas to push the UAV out of the launch tube by releasing gas into the canister;
   a recovery device for recovering the UAV while in flight; and
   a power generation and storage system comprising at least one of a photovoltaic cell and a wind turbine for supplying power to the UAV system.

2. The UAV system of claim 1, wherein the launcher is rotatable in response to a signal indicative of at least one of wind direction and wind speed.

3. The UAV system of claim 1, wherein the recovery device is rotatable in response to a signal indicative of at least one of wind direction and wind speed.

4. The UAV system of claim 1, further comprising a security subsystem configured to permit remote monitoring an area around the UAV system.

5. The UAV system of claim 1, further comprising a device positioned within the canister and behind the UAV upon which the released gas exerts pressure for pushing the UAV out of the launch tube.

6. The UAV system of claim 1, wherein the launcher is mounted on a fixed support structure.

7. The UAV system of claim 1, wherein the launcher is mounted on a mobile support structure.

8. The UAV system of claim 1, further comprising a command and control subsystem and a communications subsystem configured to allow manual UAV launch by a remote operator.

9. The UAV system of claim 1, further comprising a command and control subsystem and a communications subsystem configured to allow automatic UAV launch in response to a signal from a remote sensor.

10. The UAV system of claim 1, wherein the launcher is mounted on a waterborne vessel.

11. The UAV system of claim 1, wherein the energetics module comprises a plurality of gas generators for releasing gas into the canister.

12. The UAV system of claim 11, wherein the gas generators are automotive air bag inflators.

13. The UAV system of claim 11, further comprising a controller for activating the gas generators sequentially and with a predetermined time delay to expel the UAV with a desired velocity and acceleration.

14. A method of operating an unmanned aerial vehicle (UAV) system, comprising:
   loading a canister containing the UAV into a launcher;
   supplying power to the UAV system using at least one of a photovoltaic cell and a wind turbine;
   activating a plurality of gas generators sequentially and with a predetermined time delay to expel the UAV with a desired velocity and acceleration; and
   recovering the UAV while in flight in a UAV recovery device.

15. The method of claim 14, further comprising rotating the launcher in response to a signal indicative of at least one of wind direction and wind speed.

16. The method of claim 14, further comprising remotely monitoring an area around the UAV system.

17. The method of claim 14, further comprising mounting the launcher on a fixed support structure.

18. The method of claim 14, further comprising mounting the launcher on a mobile support structure.

19. The method of claim 14, wherein the launcher is mounted on a waterborne vessel.

* * * * *